(12) United States Patent
Hoa

(10) Patent No.: US 9,870,125 B2
(45) Date of Patent: Jan. 16, 2018

(54) AUTO SCANNING INPUT METHOD AND APPARATUS

(71) Applicant: Apple Inc., Cupertino, CA (US)

(72) Inventor: Patti P. Hoa, San Jose, CA (US)

(73) Assignee: APPLE INC., Cupertino, CA (US)

( * ) Notice: Subject to any disclaimer, the term of this patent is extended or adjusted under 35 U.S.C. 154(b) by 565 days.

(21) Appl. No.: 14/502,748

(22) Filed: Sep. 30, 2014

(65) Prior Publication Data

US 2015/0346920 A1    Dec. 3, 2015

Related U.S. Application Data

(60) Provisional application No. 62/005,932, filed on May 30, 2014.

(51) Int. Cl.
```
G06F 3/048       (2013.01)
G06F 3/0482      (2013.01)
G06F 3/0481      (2013.01)
G06F 3/0488      (2013.01)
G06F 3/041       (2006.01)
```

(52) U.S. Cl.
CPC .......... *G06F 3/0482* (2013.01); *G06F 3/0416* (2013.01); *G06F 3/04817* (2013.01); *G06F 3/04886* (2013.01)

(58) Field of Classification Search
CPC .... G06F 3/0484; G06F 3/023; G06F 3/04886; G06F 3/048; H04B 1/38
See application file for complete search history.

(56) References Cited

U.S. PATENT DOCUMENTS

| | | | |
|---|---|---|---|
| 6,169,538 B1 * | 1/2001 | Nowlan | G06F 3/0488 341/22 |
| 6,741,235 B1 * | 5/2004 | Goren | G06F 3/04886 345/168 |
| 6,847,311 B2 * | 1/2005 | Li | H04M 1/72519 341/22 |

(Continued)

*Primary Examiner* — Rashawn Tillery
(74) *Attorney, Agent, or Firm* — Morgan, Lewis & Bockius LLP

(57) ABSTRACT

Some embodiments provide a novel auto-scanning method for navigating elements within a user interface (UI) of a computing device. This method associates the UI elements into several overlapping groups, with each group having more than one element and having at least one element in common with at least one other group. The method successively identifies a different group of elements as a selectable group for a different duration of time. While a group is selectable, a user can select the group through an input device or mechanism. If a user does not select a first group of elements that is selectable during a first time period, the method identifies a second group of elements as being selectable during a second time period. While identifying the second group as selectable during the second time period, the method identifies the first as not being selectable during this time period. When a user selects a group of elements while the group is identified as being selectable, the method successively identifies as selectable different elements within the selected group. Upon receiving selection of a particular element within the selected group, the method performs an action associated with the particular element.

26 Claims, 10 Drawing Sheets

(56) References Cited

U.S. PATENT DOCUMENTS

| | | | |
|---|---|---|---|
| 7,770,125 B1* | 8/2010 | Young | G06F 9/4443 715/764 |
| 2002/0078467 A1* | 6/2002 | Rosin | H04N 5/44543 725/110 |
| 2002/0089548 A1* | 7/2002 | Marler | G06F 3/04842 715/810 |
| 2008/0005701 A1* | 1/2008 | Park | G06F 3/0482 715/841 |
| 2012/0030607 A1* | 2/2012 | Michel | G06F 3/0238 715/773 |
| 2012/0062465 A1* | 3/2012 | Spetalnick | G06F 3/0236 345/168 |
| 2012/0218307 A1* | 8/2012 | Lin | G06F 3/0482 345/660 |
| 2014/0195960 A1* | 7/2014 | Toebes | G06F 3/0236 715/773 |
| 2016/0139803 A1* | 5/2016 | Yan | G06F 3/0216 715/773 |

\* cited by examiner

AUTO SCANNING INPUT METHOD AND APPARATUS

BACKGROUND

Various types of input devices, such as keyboards, mice, track pads, touch screens, and the like, have been developed to enable a user to interact with a computing device. While these traditional input devices provide users with quick and intuitive ways to interact with computing devices, they all require a significant amount of movement by the users. This presents a problem for physically-impaired users that lack the fine motor skills required to operate such input devices. For example, some physically-impaired users are unable to move a finger across the surface of a touch screen device and thus, cannot operate a touch-sensitive device, such as a tablet computer. Similar problems can arise with the use of a keyboard or mouse.

Thus, improved input devices and methods are desired for physically-impaired users.

BRIEF SUMMARY

Some embodiments provide a novel auto-scanning method for navigating elements within a user interface (UI) of a computing device. This method associates the UI elements into several overlapping groups, with each group having more than one element and having at least one element in common with at least one other group. The method successively identifies a different group of elements as a selectable group for a different duration of time. While a group is selectable, a user can select the group through an input device or mechanism, such as a keyboard, cursor controller (e.g., mouse, trackpad, etc.), touch-sensitive screen, gesture detector (e.g., detector for detecting eye, face, head, or hand movement), etc.

If a user does not select a first group of elements that is selectable during a first time period, the method identifies a second group of elements as being selectable during a second time period. While identifying the second group as selectable during the second time period, the method identifies the first as not being selectable during this time period. When a user selects a group of elements while the group is identified as being selectable, the method successively identifies as selectable different elements within the selected group. Upon receiving selection of a particular element within the selected group, the method performs an action associated with the particular element.

The auto-scanning method of some embodiments is advantageous as a motor-impaired user can use it to navigate the device's UI within minimal inputs to first select a group of elements and then select one element within the selected group. The overlapping nature of the selectable groups is also advantageous in that it increases the temporal duration during which any particular element is selectable. This is because each element is in at least two successively enabled groups, and hence can have its selection process started by initially selecting one of the groups that contains it.

Different embodiments use different mechanisms to successively identify each group that is selectable in each time period. On a display screen (e.g., the device's screen or a screen driven by the device), the method of some embodiments visually identifies at different times different groups of elements as being selectable. For example, in some embodiments, the method visually identifies a group by highlighting all the elements in the group. Other embodiments use other techniques to change the visual appearance of the elements in the group. For instance, in some embodiments, the method changes the size and/or color of the elements, while in other embodiments, it employ shapes or brackets that fully or partially surround the elements in the group. Still other embodiments employ other visual indicators.

Different embodiments use the auto-scanning method to select different types of elements in different embodiments. Examples of such elements include (1) items in a menu (e.g., a flat or radial menu), or (2) icons in an arrangement of icons (e.g., on a desktop of a laptop or computer, or on a page of a smartphone or tablet). Alphanumeric characters are another example of elements that can be auto-scanned by using the method of some embodiments. Specifically, the method of some embodiments displays an arrangement of the alphanumeric characters. For this arrangement, the method defines various overlapping groups of characters. In some embodiments, the method sequentially scans the groups of characters to specify different groups as being selectable at different time periods. Upon the selection of a group, the method scans the characters within the selected group. When one of the characters is selected within the group, the method performs the action associated with the selected character. In some embodiments, this action involves adding the selected character to a character string that is being input to the device.

In some embodiments, the method scans through the elements in a hierarchical manner. For instance, in some embodiments, the method initially scans through overlapping groups of elements, with each group including multiple sub-groups and including at least one sub-group in common with another group. When one group is selected while it is designated as selectable, the method then scans through the sub-groups of the selected group. In some embodiments, each sub-group has multiple elements and has at least one element in common with another element.

When a user selects a sub-group while the sub-group is identified as being selectable, the method successively identifies as selectable different elements within the selected group. Upon receiving selection of a particular element within the selected group, the method performs an action associated with the particular element. This hierarchical approach is only three levels deep. However, one of ordinary skill will realize that the auto-scanning method of some embodiments traverses a hierarchical grouping of elements with more than three levels of hierarchy.

In some embodiments, the auto-scanning method provides a control for specifying the number of characters in each selectable group. Also, in some embodiments, the method provides a control for specifying the number of characters that overlap between successive groups. The method of some embodiments also provides a control for defining an arrangement of selectable elements, e.g., defining an arrangement of alphanumeric characters into a QWERTY or other keyboard arrangement.

The preceding Summary is intended to serve as a brief introduction to some embodiments of the invention. It is not meant to be an introduction or overview of all-inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel auto-scanning method for navigating elements within a user interface (UI) of a computing device. This method defines multiple overlapping groups of UI elements, with each group having more than one element and having at least one element in common with at least one other group. The method successively identifies a different group of elements as a selectable group for a different duration of time. While a group is selectable, a user can select the group through an input device or mechanism, such as a keyboard, cursor controller (e.g., mouse, trackpad, etc.), touch-sensitive screen, gesture detector (e.g., detector for detecting eye, face, head, or hand movement), etc.

If a user does not select a first group of elements that is selectable during a first time period, the method identifies a second group of elements as being selectable during a second time period. While identifying the second group as selectable during the second time period, the method identifies the first group as not being selectable during this time period. When a user selects a group of elements while the group is identified as being selectable, the method successively identifies as selectable different elements within the selected group. Upon receiving selection of a particular element within the selected group, the method performs an action associated with the particular element.

The auto-scanning method of some embodiments is advantageous as a motor-impaired user can use it to navigate the device's UI within minimal inputs to first select a group of elements and then select one element within the selected group. The overlapping nature of the selectable groups is also advantageous in that it increases the temporal duration during which any particular element is selectable. This is because each element is in at least two successively enabled groups, and hence can have its selection process started by initially selecting one of the groups that contains it.

Figure 1:
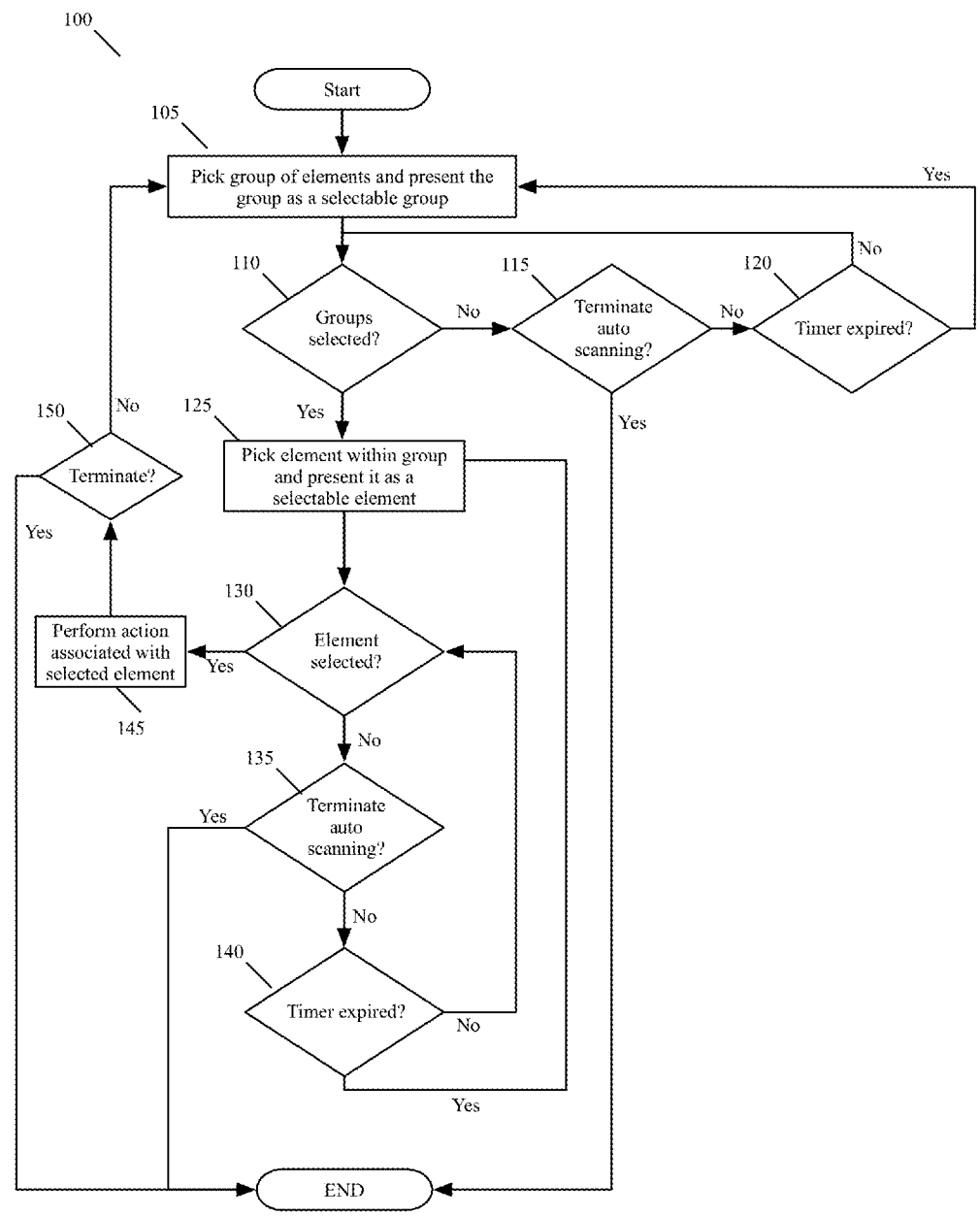
FIG. 1 conceptually illustrates an auto-scanning process of some embodiments.

FIG. 1 conceptually illustrates an auto-scanning process 100 of some embodiments. In some embodiments, the process 100 is executed by a device to allow a user (e.g., a motor-impaired user) to navigate the device's UI with minimal inputs. This process will be described by reference to FIGS. 2 and 3, which illustrate the use of this process to auto-scan and select alphanumeric characters. Although this process is described by reference to the scanning of alphanumeric characters, one of ordinary skill will realize that this process is used in other embodiments to auto-scan other types of elements. Examples of such elements include (1) items in a menu (e.g., a flat or radial menu), and (2) icons in an arrangement of icons (e.g., on a desktop of a laptop or computer, or on a page of a smartphone or tablet), as further described below by reference to FIGS. 7-9.

Figure 2:
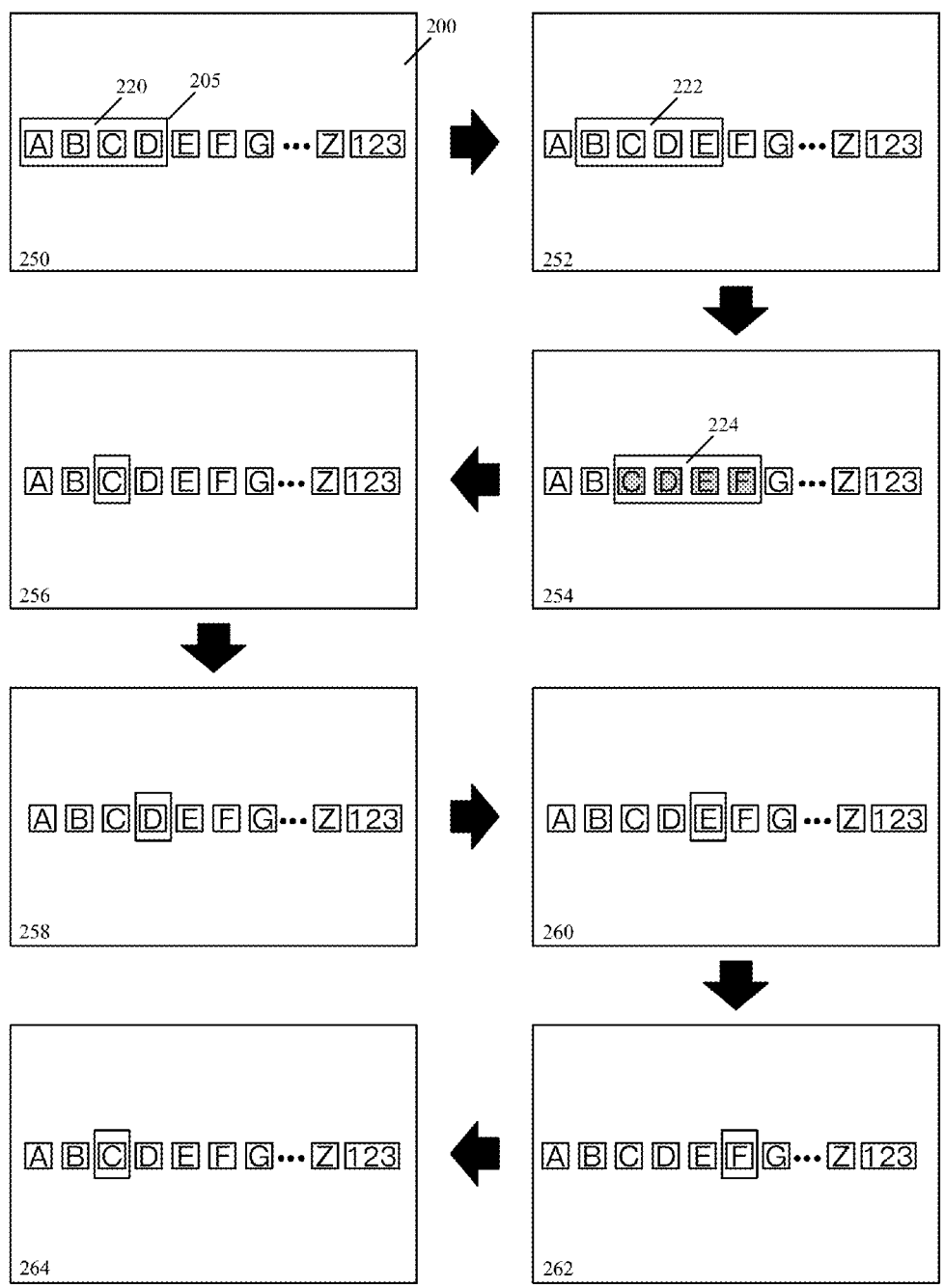
FIGS. 2 and 3 illustrate examples of the process described in FIG. 1, to auto-scan and select alphanumeric characters.
Figure 3:
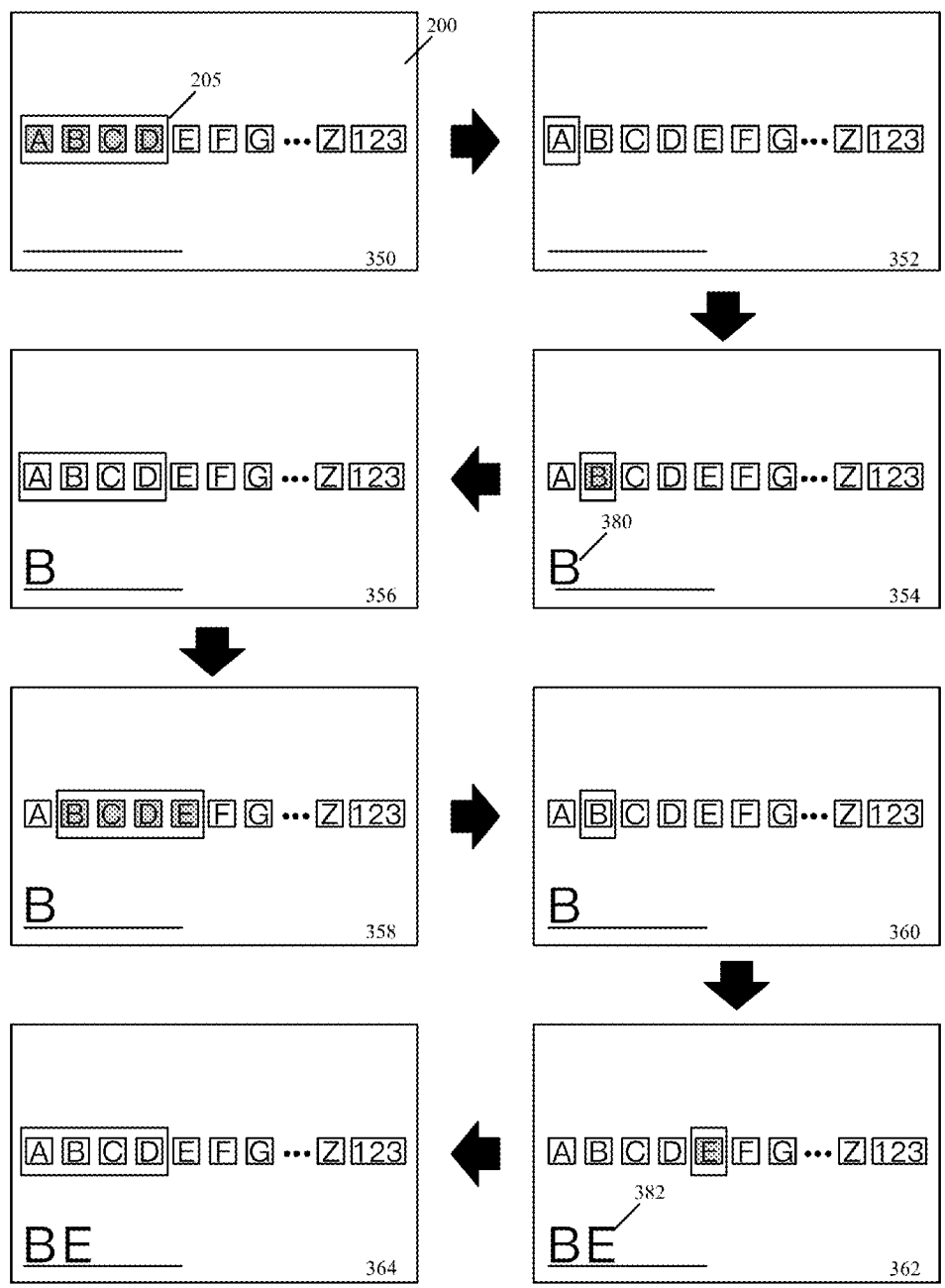

In the examples illustrated in FIGS. 2 and 3, the characters are displayed in a UI 200 that is displayed on a display screen of a computing device or a display screen driven by the computing device. As further described below, each of these figures shows eight operational stages of the UI 200. Also, in these examples, the characters form a virtual keyboard 205 that is arranged in a linear layout. In other examples, the characters are arranged in multiple rows, or in the QWERTY keyboard layout format, or in some other format.

As further described below, the auto-scanning process 100 allows a user to enter a string of characters (e.g., an acronym, a word, a paragraph, etc.) by having the process iteratively auto-scan the virtual keyboard. In each iteration, the process scans different overlapping groups of characters, so that a user can first select a group and then select a character within the selected group for the input character string. In the examples illustrated in FIGS. 2 and 3, each group has four characters and overlaps with up to four other groups.

In some embodiments, the process 100 starts each time that the user of the device initiates an auto-scan operation. The user initiates the auto-scan operation differently in different embodiments. Examples of the different input mechanisms that are used to initiate the auto-scan operation include: pressing a key on a physical keyboard, tapping a screen, clicking on a cursor controller, moving a joystick, performing a body gestural movement (e.g., an eye, face, head, or hand movement), etc. In some embodiments, the process 100 can be initiated by using two or more of these input mechanisms.

As shown in FIG. 1, the process initially (at 105) identifies a group of elements and presents this group as a selectable group of elements. In some embodiments, multiple groups of elements are defined before the process 100 starts, while in other embodiments, the groups are defined on-the-fly by the process 100. Each group in some embodiments is an associated set of elements that can be selected together. Some embodiments allow the user to create directly or indirectly the association between the elements in order to create the groups. For instance, as further described below, some embodiments allow the user to specify the number of characters in the auto-scanned groups, and from this number, the auto-scanning process of some embodiments can generate the groups.

Different embodiments use different techniques to designate an identified group (i.e., a group identified at 105) as a selectable group in the UI. The approach illustrated in FIGS. 2 and 3 highlights the identified group in the UI by placing a box 205 around the characters in this group. Other techniques will be described below by reference to FIGS. 4 and 5.

The process 100 designates each identified group as a selectable group for a time period. Accordingly, after 105, the process 100 determines (at 110) whether the identified group has been selected by the user. If not, the process transitions to 115 to determine whether it should terminate the auto-scanning. In some embodiments, the process decides (at 115) to terminate when it has repeatedly scanned the groups multiple times without the user making a selection. Also, in some embodiments, the process terminates when it receives user input to terminate. The user input to terminate the auto-scan process 100 in some embodiments comes through the same input mechanism that is used to start the process. As described above, these input mechanisms include pressing a key on a physical keyboard, tapping a screen, clicking on a cursor controller, moving a joystick, performing a body gestural movement (e.g., an eye, face, head, or hand movement), etc. In some embodiments, the process 100 can be terminated by using two or more of these input mechanisms.

When the process determines (at 115) that it should not terminate, it determines (at 120) whether the time period for designating the identified group as selectable has expired. When the process determines (at 120) that the time period has not expired, it transitions back to 110 to determine whether the identified group has been selected. The process loops through 110-120 until it determines (at 110) that the identified group is selected, determines (at 115) that it should terminate, or determines (at 120) that the time period has expired.

When the process determines (at 120) that the time period for the identified, designated group has expired, the process returns to 105 to pick another group of elements and present this group as a selectable group of elements. Stages 250, 252, and 254 of FIG. 2 show the auto-scanning process designating three different groups 220, 222, and 224 of characters as being selectable during three different time periods. The group 220 in the first stage 250 includes characters A-D (which are selectable during a first time period), the group 222 in the second stage 252 includes characters B-E (which are selectable during a second time period), and the group 224 in the third stage 254 includes characters C-F (which are selectable during a third time period).

As mentioned above, the process cycles through the groups until a group is selected (at 110) or until the process determines (at 115) to terminate. FIG. 2 illustrates the selection of the group 224 in its third stage 254. This selection is pictorially represented in this figure by the highlighting of the characters C-F. Other embodiments use other techniques to illustrate the selection of a group.

When the process determines (at 110) that a group has been selected, it transitions to 125 to identify an element within the selected group, and to present this element as a selectable element in the UI. Different embodiments use different techniques to designate an identified element (i.e., an element identified at 125) as a selectable element in the UI. The approach illustrated in FIGS. 2 and 3 highlights the identified element in the UI by placing a box 215 around the identified character in this group. Other techniques will be described below by reference to FIGS. 4 and 5.

The process 100 designates each identified element as a selectable element for a time period. Accordingly, after 125, the process 100 determines (at 130) whether the identified element has been selected by the user. If not, the process transitions to 135 to determine whether it should terminate the auto-scanning. In some embodiments, the process decides (at 115) to terminate when it has repeatedly scanned the elements within the selected group (i.e., the group selected at 110), without the user making a selection. Also, in some embodiments, the process terminates when it receives user input to terminate, e.g., through one or more of the above-described input mechanisms.

When the process determines (at 135) that it should not terminate, it determines (at 140) whether the time period for designating the identified element as selectable has expired. When the process determines (at 140) that the time period has not expired, it transitions back to 130 to determine whether the identified element has been selected. The process loops through 130-140 until it determines (at 130) that the identified element is selected, determines (at 135) that it should terminate, or determines (at 140) that the time period has expired.

When the process determines (at 140) that the time period for the identified, designated element has expired, the process returns to 125 to pick another element in the selected group (i.e., the group selected at 110) and to present this element as a selectable element in the UI for a time period. The process cycles through the elements of a selected group until an element is selected (at 130) or until the process decides (at 135) to terminate.

Stages 256-264 of FIG. 2 show the auto-scanning process cycling through the characters C, D, E, F, and then back to C during five different time periods. Specifically, the fourth stage 256 shows the designation of C as the selectable character during a fourth time period, the fifth stage 258 shows the designation of D as the selectable character during a fifth time period, the sixth stage 260 shows the designation of E as the selectable character during a sixth time period, the seventh stage 262 shows the designation of F as the selectable character during a seventh time period, and the eight stage 264 shows the designation of C as the selectable character during an eighth time period.

When the process determines (at 130) that an element has been selected, it transitions to 145 to perform an action associated with the selected element. This action is different in different embodiments. This action is often associated with the nature of the element selected. For instance, when the element is an item in a menu, or an icon (e.g., an application icon) displayed on a desktop or a page, the action is an action that an operating system or an application (executing on the device) has to perform upon the selection of the item or icon. When the element is a character in a virtual keyboard, the selection of the character (at 130) in some embodiments directs the process to enter (at 145) the selected character in a character string that is being input to the device, as further described below.

After 145, the process determines (at 150) whether it should terminate. In some embodiments, the process terminates after an action for a selected element is performed at 145. In other embodiments, the process terminates only after the user provides input (e.g., through one of the above-described input mechanisms, such as keyboard, touchscreen, gestural input, cursor controller, joystick, etc.) to terminate the auto-scanning process. When the process determines (at 150) that it should terminate, the process ends. Otherwise, it returns to 105 to start the process for selecting another element.

When the auto-scanning process 100 is performed to select characters on a virtual keyboard, multiple iterations through the operations 105-145 allows a user to enter a string of characters (e.g., an acronym, a word, a paragraph, etc.). In each iteration, the process starts an auto-scan operation that first scans different overlapping groups of characters, and then scans through the characters of a selected group, so that a user can enter a character in that iteration.

FIG. 3 illustrates an example of two iterations of the operations 105-145 during which the user enters the input string BE. In the first three stages 350-354 of this figure, the process identifies the group A-D, and the user selects this group and then selects the character B. The selection of the character B creates a one-character string 380, which is displayed in the UI 200. In the next four stages 356-362, the process sequentially identifies the group A-D and B-E, the user selects the group B-E, the process sequentially and individually identifies B, C, D, and E, before the user selects the character E. The selection of the character E creates a two-character string 382, which is displayed in the UI 200.

Figure 4:
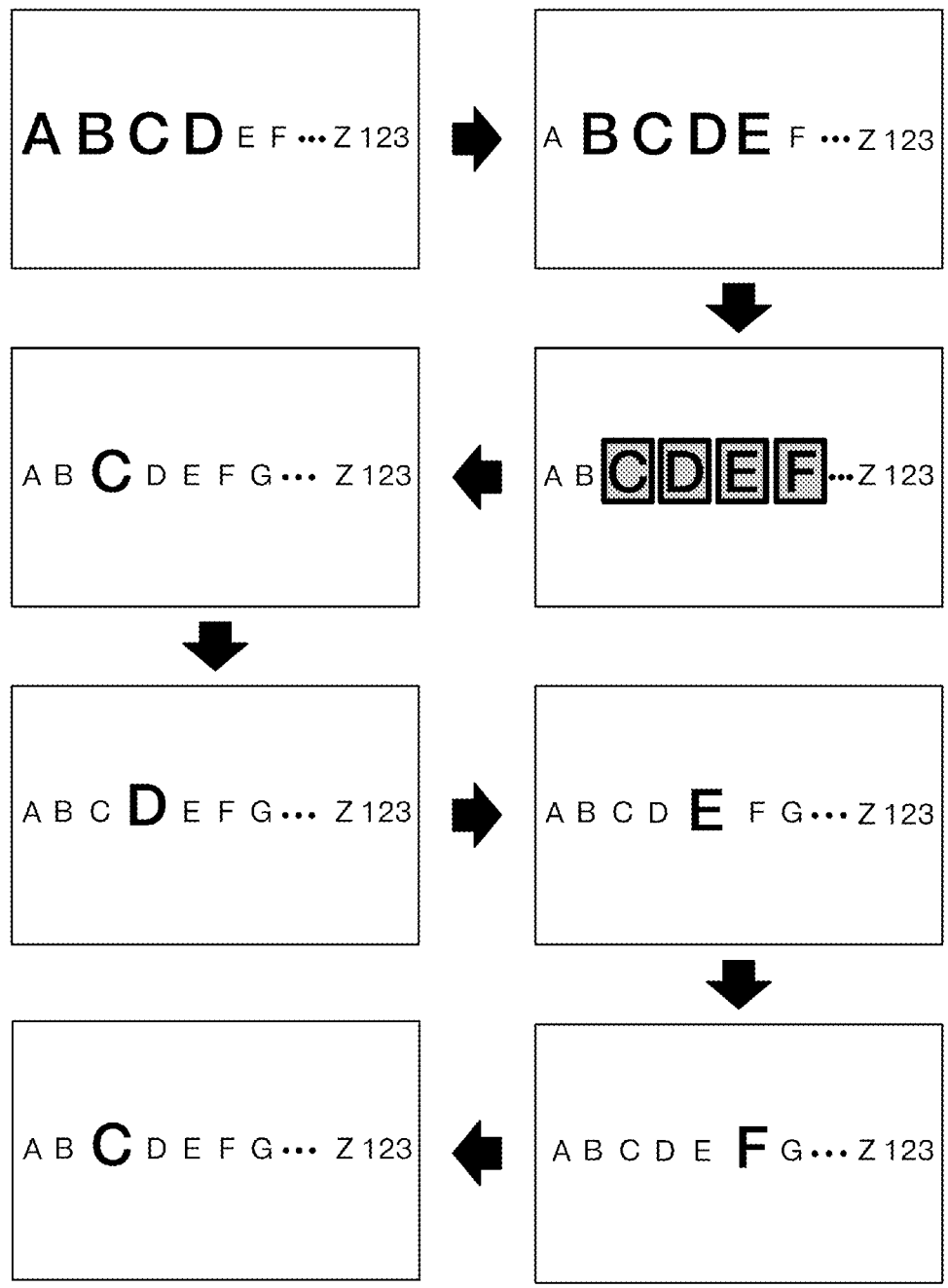
FIGS. 4 and 5 illustrate alternative manners of designating the selectable groups and characters.
Figure 5:
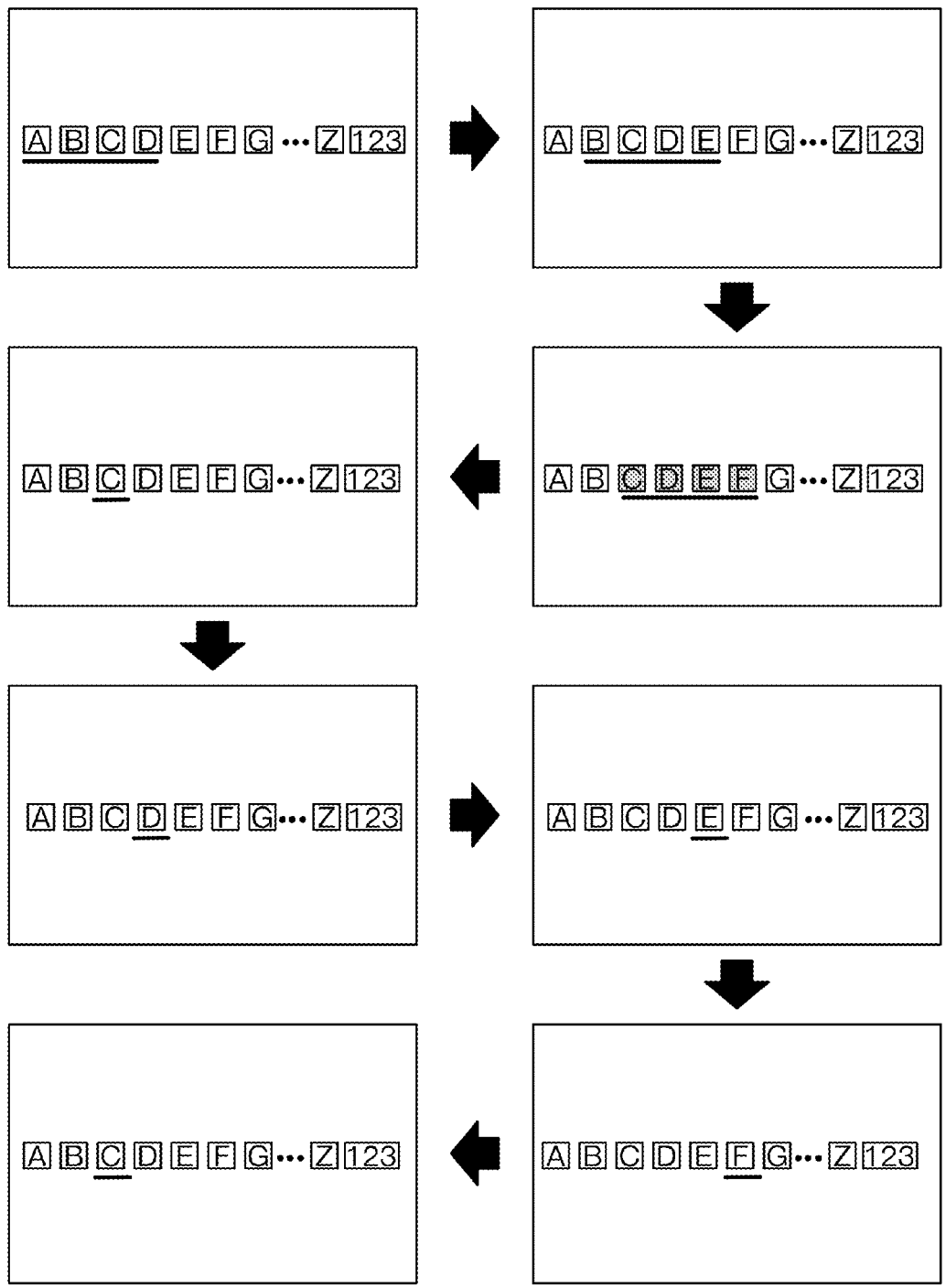

Different embodiments use different techniques to designate a group or an element as a selectable group or element in the UI. FIGS. 2 and 3 highlight the identified group in the UI by placing a box 205 around the characters in this group. For the example illustrated in FIG. 2, FIGS. 4 and 5 illustrate alternative manners of designating the selectable groups and characters. The approach illustrated in FIG. 4 enlarges and bolds each selectable group of characters and each individually selectable character in a selected group. The approach illustrated in FIG. 5 underlines each selectable group of characters and each individually selectable character in a selected group. One of ordinary skill will realize that other embodiments use a multitude of other visual indicators (e.g., color, brackets, etc.) to identify a selectable group of elements or characters.

Figure 6:
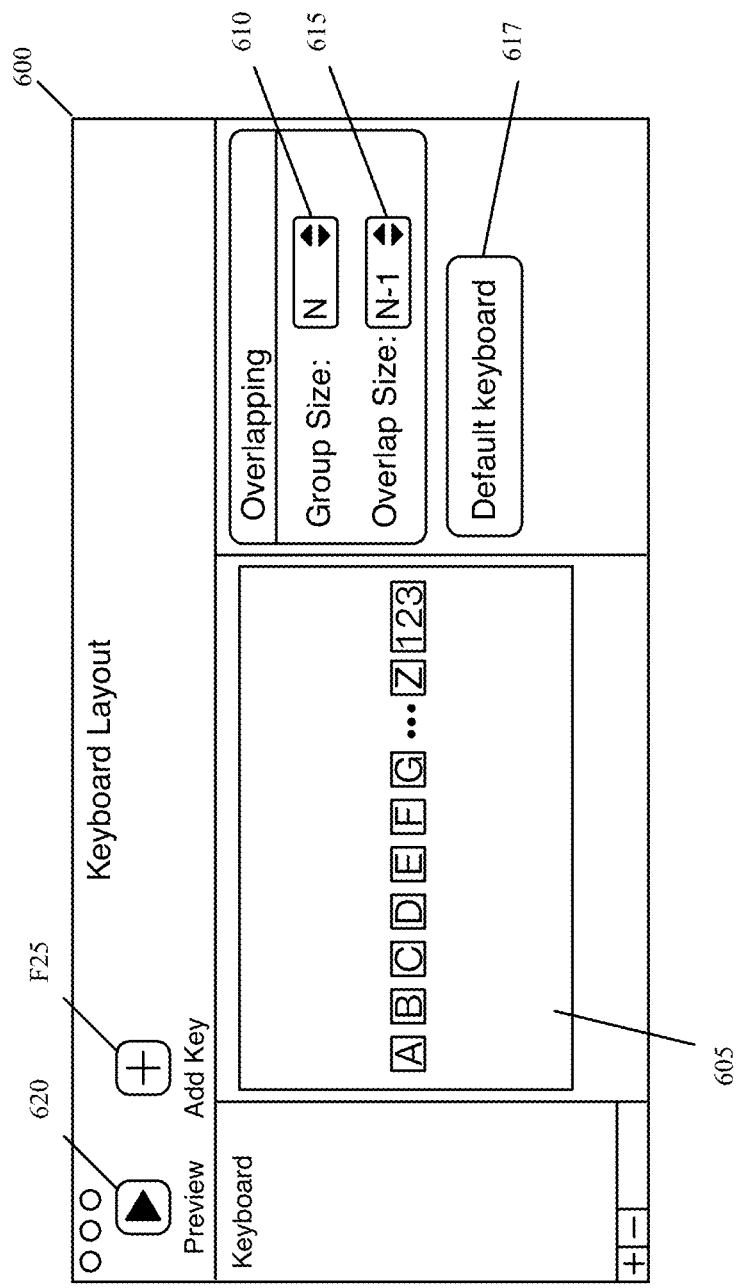
FIG. 6 illustrates a configuration UI of the auto-scanning tool of some embodiments, with which, a user can configure various aspects of the auto-scanning operation.

In some embodiments, the device's auto-scanning tool provides controls for arranging the characters in the virtual keyboard, specifying the number of characters in each selectable group, and/or specifying the number of characters that overlap between successive groups. FIG. 6 illustrates an example of such controls. Specifically, it illustrates a configuration UI 600 of the auto-scanning tool of some embodiments. Through this UI, a user can configure various aspects of the auto-scanning operation.

As shown, the UI 600 includes a keyboard-layout area 605, groups controls 610 and 615, a default keyboard button 617, a preview control 620, and an add key button 625. By selecting the default keyboard button 617, a user can request a default keyboard that is defined for the auto-scanning tool, such as a linear keyboard shown in FIG. 2, a traditional QWERTY keyboard, or some other default keyboard. Upon selection of the default keyboard button, the keyboard will be displayed in the keyboard-layout area 605.

Alternatively, the user can manually specify a keyboard by using the add key button 625 to see a list of keys, which the user can successively add to the keyboard layout area 605. In the keyboard layout area 605, the user can move around the alphanumeric character keys to arrange the alphanumeric keyboard layout in any desired manner. In this area, the user in some embodiments can also rearrange a default keyboard that is presented upon selection of the default button 617.

The group controls 610 and 615 allow the user to specify the scanning behavior of the auto-scanning tool. Specifically, the control 610 is a group size toll that allows the user to specify the size of each group (e.g., specify each group has to have N alphanumeric characters). The control 615 is a group size overlap control that allows the user to specify the number of characters that successive groups have to have in common (e.g., 1 to N−1 characters in common). Some embodiments have neither of these controls. Other embodiments have one of these controls (e.g., the group size control 610), but not the other control (e.g., overlap control 615).

The preview control 620 allows the user to view a preview of the auto-scanning behavior that is configured through the UI 600. In some embodiments, the selection of this control opens a display area, which then provides the preview of the auto-scanning behavior. In other embodiments, the preview is provided in the keyboard layout area 605.

Figure 7:
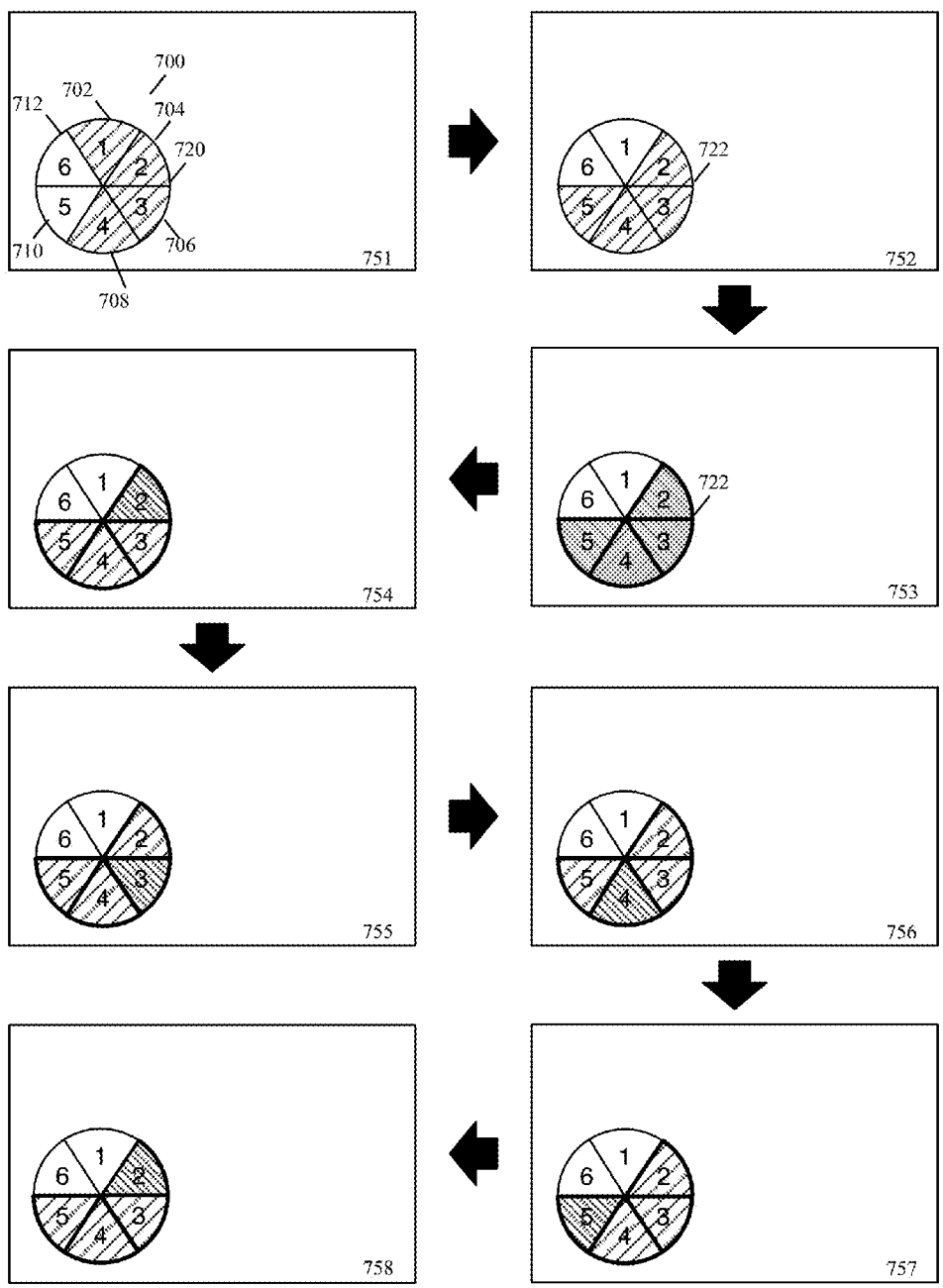
FIG. 7 illustrates an embodiment that auto-scans items in a radial menu.

Although the auto-scanning examples above describe the scanning of alphanumeric characters, one of ordinary skill will realize that some embodiments auto-scan other types of elements. For instance, FIG. 7 illustrates an embodiment that auto-scans items in a radial menu 700. The example illustrated in this figure is described in terms of eight operational stages 751-758 of the radial menu 700.

The radial menu has six items 702-712. The auto-scanning process initially scans through overlapping groups of four items. The first stage 751 shows the designation of a first group 720 (formed by items 702-708) as a selectable group, while the second stage 752 shows the designation of a second group 722 (formed by items 704-710) as a selectable group. The third stage 753 shows the selection of the second group 722. The user selects this group through any of the above-described input mechanisms (e.g., keyboard, touch-screen, gestural input, cursor controller, joystick, etc.). The selection of the second group is shown in the third stage 753 by the changing in the shading of this group.

After the selection of the second group, the auto-scanning process then sequentially scans through the items in the selected group. Thus, the fourth through eighth stages 754-758 show the process scanning through items 704, 706, 708, and 710, and then cycling back to the item 704, in order to go through these items one more time. When a user selects an item (e.g., item 704) while that item is designated as selectable by the auto-scanning process, the process performs the action associated with the selected menu item. The action can be any action that is associated typically with a flat or radial menu item, such as saving a file, opening a file, performing an edit operation (e.g., a cut operation, copy operation, paste operation, etc.), performing a print operation, etc.

Figure 8:
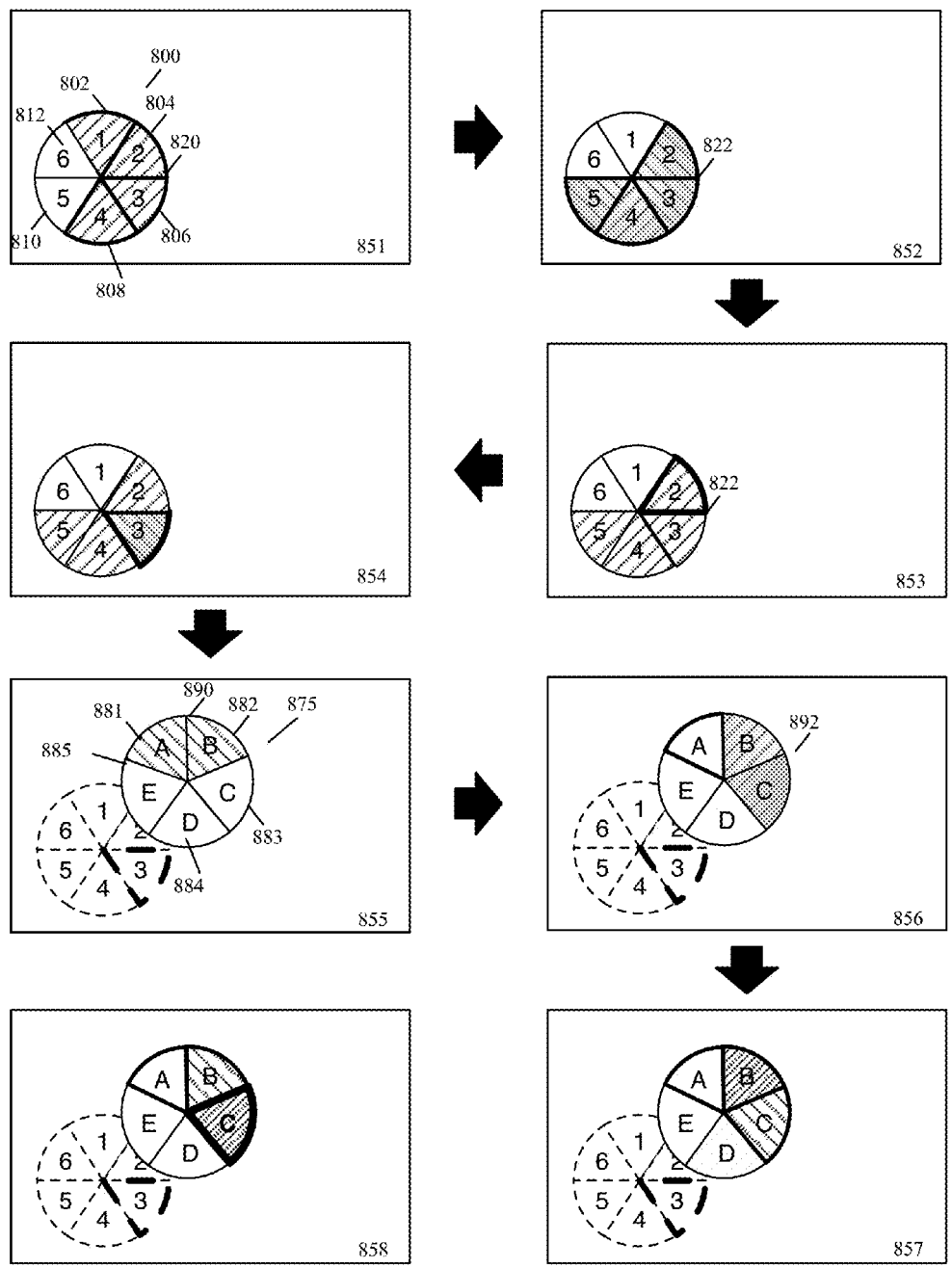
FIG. 8 illustrates an example of how the process of some embodiments performs in response to selection of a selectable item by the user.

The action might also be to open up a sub-menu. FIG. 8 illustrates an example of such an action. Specifically, this figure illustrates that some embodiments use the auto-scanning process to navigate a hierarchical organization of elements. This example is illustrated in terms of eight operational stages 851-858 of a radial menu 800 with six items 802-812.

The auto-scanning process initially scans through overlapping groups of four items. The first stage 851 shows the highlighting of a first group 820 formed by items 802-808, while the second stage 852 shows the highlighting of a second group 822 formed by items 804-810. The second stage 852 also shows the selection of the second group 822. The user selects this group through any of the above-described input mechanisms (e.g., keyboard, touch-screen, gestural input, cursor controller, joystick, etc.). The selection of the second group is shown in the second stage 852 through the shading of this group.

After the selection of the second group, the auto-scanning process then sequentially scans through the items in this group. Thus, the third stage 853 shows the process highlighting the second item 804, and the fourth stage 854 shows the process highlighting the third item 806. The fourth stage 854 also shows the selection of the third item 806 through the shading of this item.

As shown in the fifth stage 855, the selection of item 806 opens a radial sub-menu 875 that includes five items 881-885. Also as shown in this stage, the process scans through overlapping groups of two items in this radial sub-menu 875. The fifth stage 855 shows the highlighting of a group 890 formed by items 881-882, while the sixth stage 856 shows the highlighting of a group 892 formed by items 882-883. The sixth stage also shows the selection of the group 892 through the shading of this group.

After the selection of this group, the scanning process then sequentially scans through items 882 and 883 in this group. Thus, the seventh stage 857 shows the process highlighting the item 882, and the eighth stage 858 shows the process highlighting the item 883. The eighth stage 858 also shows the selection of the item 883. Once this item is selected, the process performs the action associated with it. The action can be any action that is associated typically with a flat or radial menu item, such as saving a file, opening a file, performing an edit operation (e.g., a cut operation, copy operation, paste operation, etc.), performing a print operation, etc.

Figure 9:
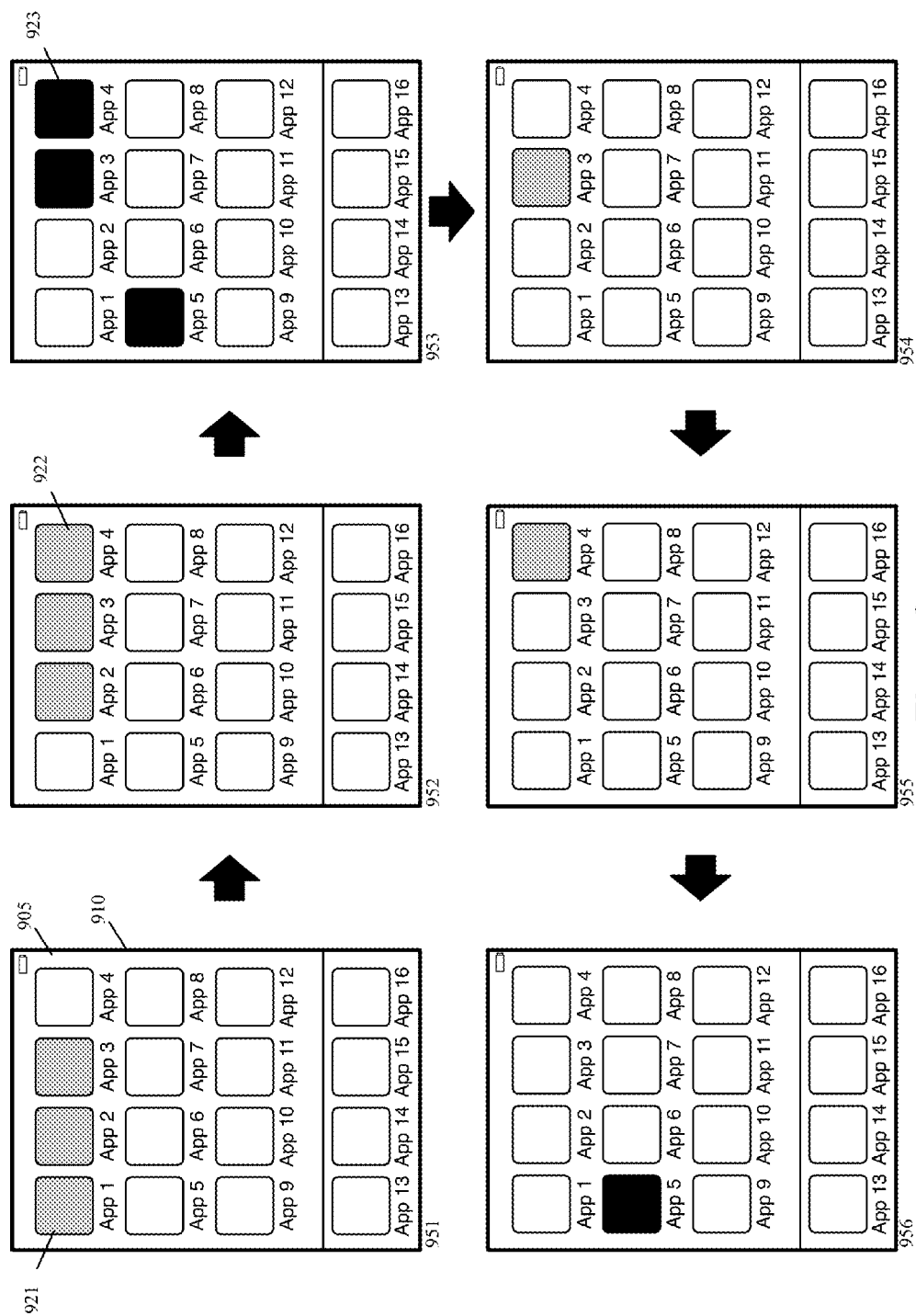
FIG. 9 illustrates an example of using the auto-scanning process of some embodiments to scan through icons.

FIG. 9 illustrates an example of using the auto-scanning process of some embodiments to scan through icons. The icons in this example are presented on a page 905 displayed on a screen of a mobile device 910. This example is illustrated in six operational stages 951-956 of the UI of the operating system of the device. As shown, the process in this example scans overlapping groups of three icons.

The first, second and third stages 951-953 respectively show the highlighting of first, second and third group 921-923 of icons. The third stage 953 also shows the selection of the third group 923 of icons through the different shading of the icons in this stage. After the selection of the third group 923, the auto-scanning process then sequentially scans through the icons in the selected group. Thus, the fourth through sixth stages 954-956 show the process scanning through these icons individually, until the last icon in this group is selected in the sixth stage 956, as indicated by the different shading of this icon. Upon this selection, the process performs the action associated with the selected icon. The action can be any action that is associated typically with an icon, e.g., opening an application associated with the icon.

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 10:
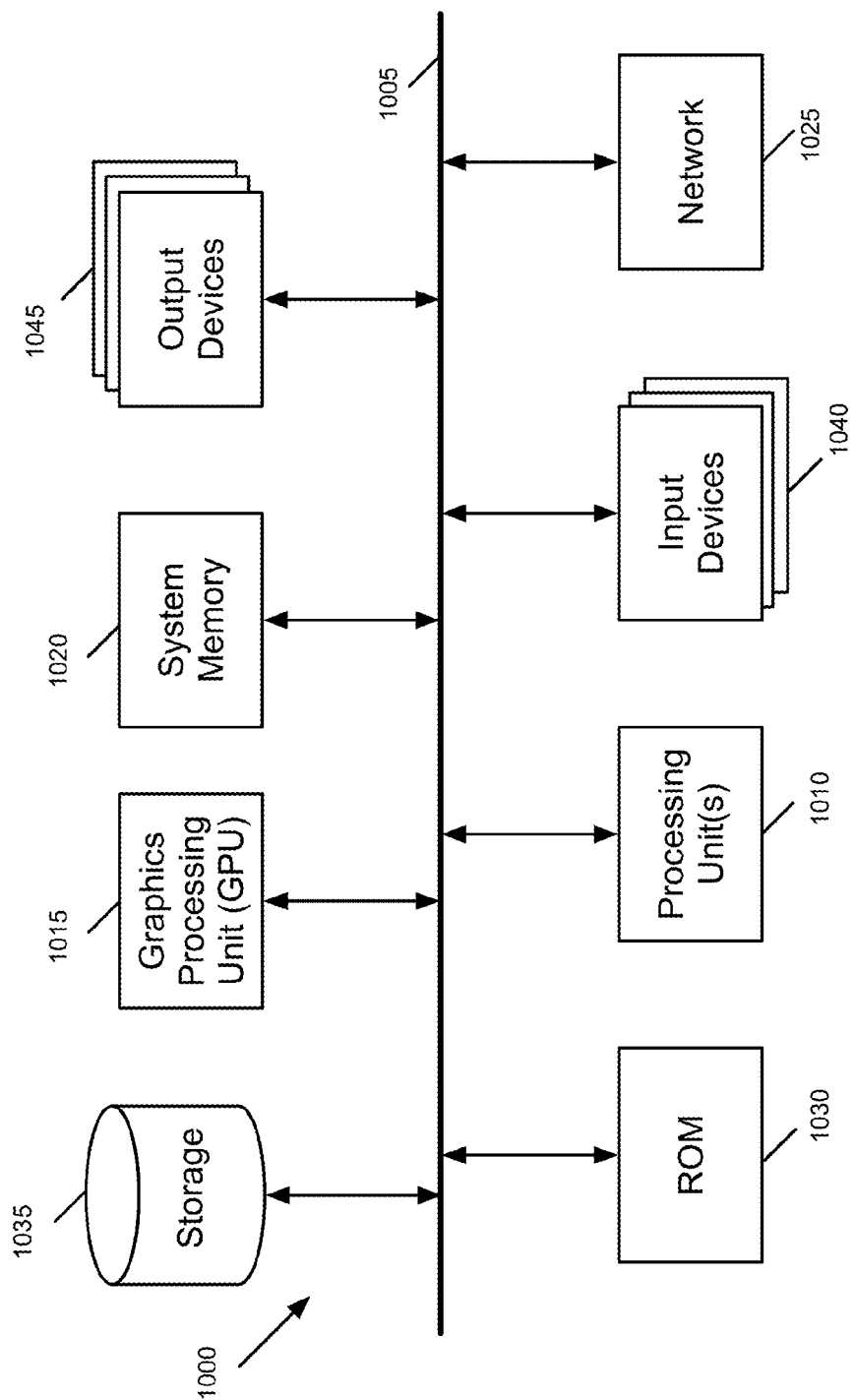
FIG. 10 conceptually illustrates an example of a computer system with which some embodiments of the invention are implemented.

FIG. 10 conceptually illustrates an example of a computer system 1000 with which some embodiments of the invention are implemented. Such an computer system includes various types of computer readable media and interfaces for various other types of computer readable media. Electronic system 1000 includes a bus 1005, processing unit(s) 1010, a graphics processing unit (GPU) 1015, a system memory 1020, communication subsystem(s) 1025, a read-only memory 1030, a permanent storage device 1035, input controls 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1030, the GPU 1015, the system memory 1020, and the permanent storage device 1035.

From these various storage units, the processing unit(s) 1010 retrieves instructions to execute and data to process in order to execute the processes of the invention performed by the computer system. The processing unit(s) may be a single processor or a multi-core processor in different embodiments. Some instructions are passed to and executed by the GPU 1015. The GPU 1015 can offload various computations or complement the image processing provided by the processing unit(s) 1010. In some embodiments, the computer system uses a system-on-a-chip that includes one or more CPU cores as well as one or more GPU cores.

The read-only-memory (ROM) 1030 stores static data and instructions that are needed by the processing unit(s) 1010 and other modules of the computer electronic system. The permanent storage device 1035, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive, integrated flash memory) as the permanent storage device 1035.

Other embodiments use a removable storage device (such as a floppy disk, flash memory device, etc., and its corresponding drive) as the permanent storage device. Like the permanent storage device 1035, the system memory 1020 is a read-and-write memory device. However, unlike storage device 1035, the system memory 1020 is a volatile read-and-write memory, such a random access memory. The system memory 1020 stores some of the instructions and data that the processor needs at runtime. In some embodiments, the invention's processes are stored in the system memory 1020, the permanent storage device 1035, and/or the read-only memory 1030. For example, the various memory units include instructions for processing multimedia clips in accordance with some embodiments. From these various memory units, the processing unit(s) 1010 retrieves instructions to execute and data to process in order to execute the processes of some embodiments.

The bus 1005 also connects to the input controls 1040 and output devices 1045. The input devices 1040 enable the user to communicate information and select commands to the electronic system. The input controls 1040 include various different inputs in different embodiments, including touchscreens, other hardware controls such as buttons, knobs, joysticks, trackballs, etc., microphones for receiving audio, and others. The output devices 1045 include touchscreen and non-touchscreen displays, as well as speakers for producing audio.

Finally, as shown in FIG. 10, bus 1005 also couples the computer electronic system 1000 to one or more communication subsystems 1025 through which the computer system can communicate. These communication subsystems may include both wireless (e.g., Bluetooth®, Wi-Fi, etc.) communication subsystems and wired (e.g., USB, Firewire®, etc.) communication subsystems. Any or all components of the computer system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, FIG. 1 conceptually illustrates an auto-scanning process. The specific operations of this process may not be performed in the exact order shown and described. The specific operations may not be performed in one continuous series of operations, and different specific operations may be performed in different embodiments. Furthermore, the process could be implemented using several sub-processes, or as part of a larger macro process. Therefore, one of ordinary skill in the art would understand that the invention is not to be limited by the foregoing illustrative details, but rather is to be defined by the appended claims.

What is claimed is:

1. For a device that has a user interface that comprises a plurality of elements, a method comprising:
   automatically, successively identifying as selectable a different group of displayed elements from a plurality of overlapping groups of concurrently displayed elements, wherein each identified group includes more than one element and includes at least one element in common with at least one other group, wherein the concurrently displayed elements of first and second groups of the plurality of overlapping groups include only a single instance of each element in common between the first and second groups;
   receiving a selection of a particular group of elements while the particular group is identified as selectable;
   in accordance with the selection of a particular group of elements, automatically, successively identifying as selectable different elements within the selected group; and
   upon receiving the selection of a particular element within the selected group, performing an action associated with the particular element.

2. The method of claim 1, wherein successively identifying a different group comprises visually identifying at different times different groups of elements as being selectable.

3. The method of claim 2, wherein visually identifying different selectable groups comprises:
   visually identifying a first group of the plurality of groups of displayed elements as being selectable for a first duration of time; and
   when the first group is not selected during the first duration of time, visually identifying a second group of the plurality of groups of displayed elements as being selectable for a second duration of time, while visually identifying the first group of the plurality of groups of displayed elements as not being selectable during the second duration of time.

4. The method of claim 1, wherein the elements are items in a menu.

5. The method of claim 1, wherein the elements are icons.

6. The method of claim 1, wherein the elements are alphanumeric characters.

7. The method of claim 6 further comprising:
   displaying an arrangement of the alphanumeric characters;

wherein performing an action for the selected particular alphanumeric character comprises including the particular character in an input character string.

8. The method of claim 6, wherein automatically, successively identifying a different group comprises automatically, successively displaying a visual indicator for each group to signify that the group is selectable.

9. The method of claim 8, wherein displaying the visual indicator for a group comprises changing an appearance of the characters within the group.

10. The method of claim 8,
wherein displaying the visual indicator for a group comprises highlighting the group;
wherein receiving the selection comprises receiving selection of the particular group when the particular group is highlighted.

11. The method of claim 6 further comprising providing a control for specifying a number of characters in each selectable group.

12. The method of claim 11 further comprising providing another control for specifying the number of characters that overlap between successive groups.

13. The method of claim 1 further comprising providing a control for defining an arrangement of alphanumeric characters.

14. The method of claim 1, wherein successively identified groups overlap in order to increase temporal duration during which any particular element that is in at least two successively enabled groups is selectable through an initial selection of one of the groups that contains the particular character.

15. The method of claim 1, wherein the groups of elements are smaller sub-groups of a particular larger group of elements, wherein the particular larger group of elements is part of a set of overlapping, larger groups of elements, the method further comprising:
before successively identifying as selectable a different sub-group of elements within the particular larger group of elements,
successively identifying as selectable a different group of elements from the set of overlapping, larger groups of elements, wherein each identified larger group includes more than one sub-group and includes at least one sub-group in common with at least one other larger group; and
receiving a selection of the particular larger group of elements while the larger particular larger group is identified as selectable.

16. A non-transitory machine readable medium for storing a program comprising sets of instructions for:
automatically, successively identifying as selectable a different group of displayed elements from a plurality of overlapping groups of concurrently displayed elements, wherein each identified group includes more than one element and includes at least one element in common with at least one other group, wherein the concurrently displayed elements of first and second groups of the plurality of overlapping groups include only a single instance of each element in common between the first and second groups;
receiving a selection of a particular group of elements while the particular group is identified as selectable;
in accordance with the selection of a particular group of elements, automatically, successively identifying as selectable different elements within the selected group; and
upon receiving the selection of a particular element within the selected group, performing an action associated with the particular element.

17. The machine readable medium of claim 16, wherein the set of instructions for automatically, successively identifying a different group comprises a set of instructions for visually identifying at different times different groups of elements as being selectable.

18. The machine readable medium of claim 17, wherein the set of instructions for visually identifying different selectable groups comprises sets of instructions for:
visually identifying a first group of the plurality of groups of displayed elements as being selectable for a first duration of time; and
when the first group is not selected during the first duration of time, visually identifying a second group of the plurality of groups of displayed elements as being selectable for a second duration of time, while visually identifying the first group of the plurality of groups of displayed elements as not being selectable during the second duration of time.

19. The machine readable medium of claim 16, wherein the elements are alphanumeric characters, the program further comprising sets of instructions for:
displaying an arrangement of the alphanumeric characters;
wherein performing an action for the selected particular alphanumeric character comprises including the particular character in an input character string.

20. The machine readable medium of claim 19, wherein the set of instructions for automatically, successively identifying a different group comprises a set of instructions for automatically, successively displaying a visual indicator for each group to signify that the group is selectable.

21. The machine readable medium of claim 20, wherein the set of instructions for displaying the visual indicator for a group comprises a set of instructions for changing an appearance of the characters within the group.

22. The machine readable medium of claim 20,
wherein the set of instructions for displaying the visual indicator for a group comprises a set of instructions for highlighting the group;
wherein the set of instructions for receiving the selection comprises a set of instructions for receiving selection of the particular group when the particular group is highlighted.

23. The method of claim 1, wherein the at least one element in common maintains an unchanged display position while identified as selectable in successive groups.

24. The method of claim 1, wherein each element in each identified group is displayed on the user interface while the identified group is selectable.

25. The machine readable medium of claim 16, wherein the set of instructions for automatically, successively identifying a different group comprises maintaining an unchanged display position for the at least one element in common while the at least one element in common is identified as selectable in successive groups.

26. The machine readable medium of claim 16, wherein the set of instructions for automatically, successively identifying a different group comprises displaying each element in each identified group on the user interface while the identified group is selectable.

* * * * *